UNITED STATES PATENT OFFICE.

ROBERT WAHL, OF CHICAGO, ILLINOIS.

PREPARATION OF MEDIA FOR YEAST PROPAGATION AND FERMENTATION.

1,379,294. Specification of Letters Patent. Patented May 24, 1921.

No Drawing. Application filed February 18, 1920. Serial No. 359,511.

*To all whom it may concern:*

Be it known that I, ROBERT WAHL, a citizen of the United States, residing at 326 W. Madison St., Chicago, in the county of Cook and State of Illinois, have invented a new and useful Improvement in Preparation of Media for Yeast Propagation and Fermentation, of which the following is a specification.

The present invention relates to the preparation of media for yeast propagation and fermentation and more particularly to such media derived from cereal products and of the character of mashes or worts, and which are intended for the purposes of alcohol manufacture, yeast production and the like.

In accordance with the present invention the mash or wort constituting the medium for yeast growth and fermentation is formed by a special treatment of malt or of a mixture of cereals including malt, whereby the constituents thereof are rendered available in a highly efficient manner for utilization by the yeast. These constituents are primarily of the classes, (1), carbohydrates, (2) nitrogenous compounds and (3) mineral salts, and are not present in the original cereal or cereal mixture treated in forms available for effective utilization by the yeast. In order to render these constituents available to the yeast it has hitherto been customary to mash the malt or cereal mixture containing malt at a temperature favorable for peptonization (45–50° C.) and after completion of the peptonization, whereby some of the nitrogenous constituents of the cereal are converted into proteoses and amino-bodies, the temperature of the mash is raised to a higher temperature (62–65° C.) favorable for diastatic conversion, whereby the starch of the cereal is saccharified. This saccharification may be carried to completion in the mash tun, as in the processes where the wort alone is utilized for the yeast, or yeast may be added to the mash before complete saccharification, as in those processes where the entire mash is utilized for the yeast. In these processes where saccharification is completed in the mash tun it has frequently been the custom to add lactic acid to the mash, preferably in the form of a liquor containing bacterially produced lactic acid, this addition being made after the completion of the diastatic conversion, as free lactic acid greatly retards the action of the diastase, or even destroys it entirely.

I have now discovered that by supplying in the mash during the peptonization period lactic acid as hereinafter described, the nitrogeneous and inorganic constituents of the cereals of the mash are made much more completely available, this being effected, I believe, by the action of the lactic acid so added in converting the insoluble phosphates of the cereals into soluble forms and by an increased activation of the peptase, resulting in a more efficient peptonization. Furthermore, the diastase of the mash is not injuriously affected, as in accordance with the present invention free acid condition of the mash is not permitted.

In accordance with the present invention I supply in the mash before or during the peptonization lactic acid in such manner and in such proportion that at the end of the peptonization period there is no free acid present as distinguished from acid salt, a suitable test for this condition being the failure of the mash to redden litmus paper. Although lactic acid as such may be utilized for this purpose by the successive addition of small quantities during mashing, I prefer to add a lactic acid liquid containing active lactic acid producing bacteria, for instance, a liquor such as that described in my prior Patent No. 1,028,508 of June 4, 1912 and containing 1% of total acidity, about one-third of which is lactic acid, as in this manner I may secure a gradual supply of lactic acid during the entire mashing period by bacterial action. By the use of lactic acid in accordance with my invention the insoluble phosphatic compounds of the cereal grains are almost entirely converted into soluble acid phosphates, being thereby rendered available for utilization by yeast. Furthermore there is an increased activation of the peptase, whereby during the peptonization period there is a more rapid and complete degradation of the nitrogenous compounds with a greater proportional formation of amino-bodies suitable for utilization by the yeast.

In carrying out the present invention upon a mash containing malt alone in the proportions of 100 lbs. of malt to 60 gals. water, I may raise the temperature to 45 to 50° C. and add to the mash lactic acid in a suitable form, for example, as approximately 10 lbs. of bacterial lactic acid liquor containing 1% of lactic acid. The mash is held at this temperature for about two hours, at the end of which period peptonization is substantially complete and the mash should not indicate the presence of free acid by reddening litmus paper. The mash is then raised to a temperature of 62–65° C., at which diastatic conversion is effected, further peptonization and lactic acid formation being thereby prevented.

The temperature of diastatic conversion is then maintained for the usual period (3 to 4 hours) for a saccharification mash, the entire mash then being drawn off, cooled and yeasted, lactic acid formation in the mash being avoided, and the diastase being conserved for further action during fermentation. If desired, after saccharification of the mash, it may be cooled to about 55° C., again inoculated with lactic acid bacteria and held for a sufficient period, (12 to 15 hours) at temperatures near 52–54° C., to allow an increase in lactic acid to a total free acid of 0.4 to 0.5 per cent. The mash may then be heated to about 70 degrees to check further lactic acid formation, the wort strained off, cooled and yeasted. It is of importance to note in connection with the present process that more than 80% of the mineral content of the grains is rendered soluble and removed in the wort, whereas by previous processes less than 50% is so removed. Furthermore, the amount of amino-bodies is increased by 50%.

Instead of malt alone, I may utilize in the production of the mash or wort a mixture of malt with cereals such as rye, barley, wheat, oats or corn, the latter being cooked if not previously gelatinized, as in the case of flakes. I may also utilize malt sprouts in the mash if desired.

In order to secure in the mash or wort as large a quantity as possible of mineral salts and amino-bodies derived from cereal products I may utilize in the mash together with malt and cereal grains, such as corn, products consisting largely of the aleurone layers of grains, such as bran or middlings of the wheat grain, or such material as cottonseed meal, linseed meal, etc. These materials serve as storage reservoirs for a considerable proportion of the mineral ingredients and of the proteid matter of the grains, which may be made available for utilization by yeast to a high degree by the process of the present invention. They are particularly rich in phosphatic compounds and in compounds of potassium, iron and manganese, as compared with the remaining parts of the grain.

In applying the present invention to the production of a medium for yeast growth and fermentation with the aid of bran I may mash bran, for example, with malt alone or with malt and another farinaceous cereal such as rye and add to the mash, held at a temperature suitable for peptonization (45–50° C.), a suitable quantity of bacterial lactic acid liquor of the character described, so that at the termination of the peptonization mash (about two hours) the phosphates of the bran and cereals will be substantially entirely converted into soluble acid phosphates and the mash will contain at no time free lactic acid. Thus I may utilize in making the mash equal quantities of malt and bran, say 50 lbs. of malt and 50 lbs. of bran, or in the case of a mash containing corn, 40 lbs. of malt, 30 lbs. of bran and 30 lbs. of corn. In either case the mash is made up with about 50 gallons of water and about 5 lbs. of 1% bacterial lactic acid liquor or its equivalent of more acid liquor is added. The mash is held at about 45° C. for a suitable period to effect complete peptonization (about two hours), at the end of which time it should not redden litmus paper. It is then raised to a temperature of about 64° C. and held until saccharification is completed (two to four hours), at the end of which time it is either cooled and yeasted or cooled and inoculated as described above by adding a small quantity of liquor containing active lactic acid bacteria, either formed by special propagation or taken from a previous mash. The mash is then cooled very slowly over a period of about 15 hours to a temperature of about 54° C., at the end of which time it should show an acidity of 0.4 to 0.5%. If the wort is to be utilized as the medium, say, for the manufacture of yeast, the mash is heated at 70° C. to prevent further bacterial activity, the wort drawn off and the grains sparged with sufficient water to make up a volume of 200 gallons for each 100 lbs. of material utilized.

The wort thus produced before sparging will ordinarily contain about 18% of solids, the percentage being variable within wide limits, depending upon its dilution. If desired, it may be concentrated to a syrup containing 75–77% of solids, in which form it is very suitable for the market, forming a yellowish brown thick syrup with a pleasant, malty, sweetish taste. It contains a high proportion of amino-bodies, of soluble phosphates and of mineral constituents relative to the total solids; thus the proportion of amino-bodies to total solids may be from 3.75 to 4% of the total solids; the soluble phosphates, calculated as $KH_2PO_4$, at least 1.25% to 2% and the ash 3.1 to 3.4%.

When corn grits are utilized in the preparation of the mash it is preferred that the corn be cooked separately with a portion of the malt while the remainder of the malt is mashed with the bran in the manner above described. The cooked corn mash is then added to the malt and bran mash so that conversion of the starch of the corn takes place at 62–63° C.

The present process has been described in connection with certain specific methods of carrying it out and likewise in connection with certain theories as to its operation and results. It is not intended however, that these shall be regarded as limitations upon the scope of the invention, except in so far as included in the accompanying claims.

I claim:

1. The process of preparing media for yeast growth and fermentation, which consists in forming a malt containing mash, holding it at a temperature suitable for peptonization continually supplying thereto during peptonization lactic acid in amounts such that no free lactic acid remains in the mash during peptonization or at its termination, subsequently raising the temperature to a degree suitable for saccharification and saccharifying the mash.

2. The process of preparing media for yeast growth and fermentation, which consists in forming malt containing mash, adding thereto bacterial lactic acid liquor and holding the mash at a temperature suitable for peptonization, the quantity of acid liquor added being so proportioned that no free lactic acid is present at the termination of the peptonization, subsequently raising the temperature to a degree suitable for saccharification and saccharifying the mash.

3. The process of preparing media for yeast growth and fermentation, which consists in forming a malt containing mash, adding thereto about 10% by weight of the malt of bacterial lactic acid liquor containing 1% of acid, holding the mash at the temperature of 45–50° C. for about two hours, raising the temperature of the mash to 62–65° C. and holding this temperature to saccharify the mash.

4. The process of preparing media for yeast growth and fermentation, which consists in forming a malt and bran containing mash, adding thereto bacterial lactic acid liquor and holding the mash at a temperature suitable for peptonization, the quantity of acid liquor added being so proportioned that no free lactic acid is present at the termination of the peptonization, subsequently raising the temperature to a degree suitable for saccharification and saccharifying the mash.

5. The process of preparing media for yeast growth and fermentation, which consists in forming a malt and bran containing mash, adding thereto bacterial lactic acid liquor and holding the mash at a temperature suitable for peptonization, the quantity of acid liquor added being so proportioned that no free lactic acid is present at the termination of the peptonization, subsequently raising the temperature to a degree suitable for saccharification and saccharifying the mash and forming lactic acid in the saccharified mash.

6. The process of preparing media for yeast growth and fermentation, which consists of forming a malt and bran containing mash, adding thereto bacterial lactic acid liquor in the approximate proportions of 10 lbs. of acid liquor containing 1% of acid to each 100 lbs. of malt in the mash, holding the mash at 45–50° C. for about two hours, raising the temperature to 62–65° C., completely saccharifying the mash, subsequently forming therein by bacterial action 0.4 to 0.5% lactic acid, and drawing off the wort.

7. A malt liquor in which the total solids contain at least 1.25% of soluble phosphates, calculated as $KH_2PO_4$.

8. A malt syrup containing 75–77% of total solids, of which at least 3.75% are amino-bodies and 1.25% soluble phosphates calculated as $KH_2PO_4$.

ROBERT WAHL.